Oct. 19, 1954
H. T. BALCH
2,692,371
MODULATOR CIRCUIT
Filed April 30, 1952
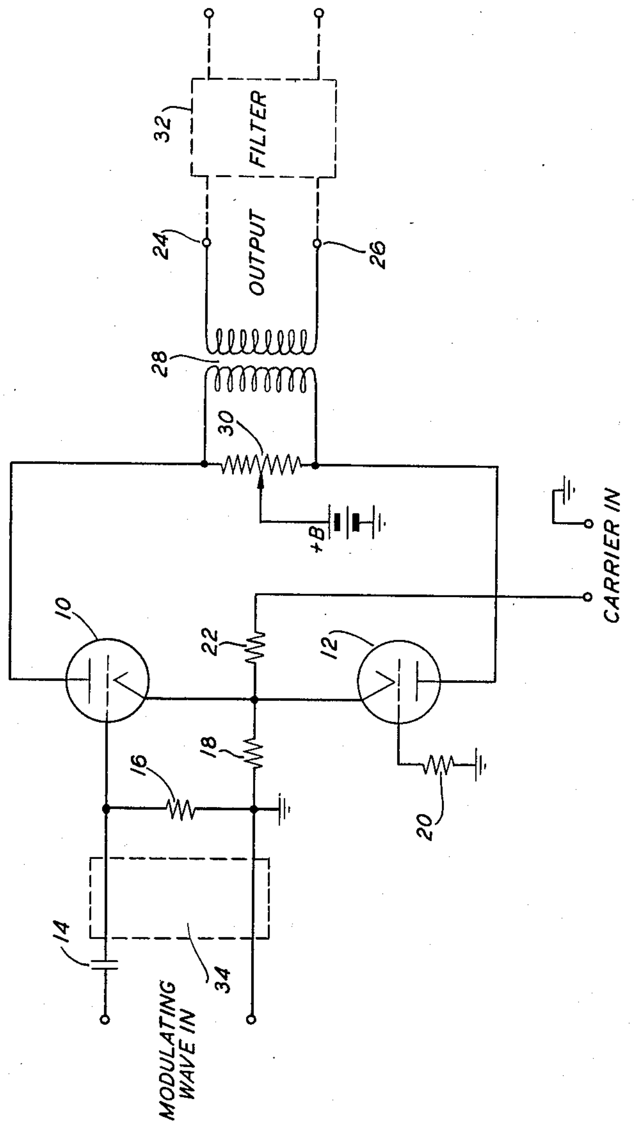
INVENTOR
H. T. BALCH
BY George C. Lord
ATTORNEY Patented Oct. 19, 1954

2,692,371

UNITED STATES PATENT OFFICE 2,692,371

MODULATOR CIRCUIT

Hugh T. Balch, Livingston, N. J., assignor to Bell Telephone Laboratories, Incorporated, New York, N. Y., a corporation of New York Application April 30, 1952, Serial No. 285,106

4 Claims. (Cl. 332—43)

This invention relates to modulation apparatus and more particularly to the type of apparatus commonly known as a balanced modulator.

Balanced modulators are well known in the art and are often employed in radio or wire carrier systems in which it is desired to obtain suppression of the carrier wave with single or double sideband transmission. Common circuits of this type, as illustrated at page 551 of Radio Engineers' Handbook by Terman, McGraw-Hill, 1943, involve a pair of vacuum tubes to which a carrier voltage is applied in the same phase and a modulating voltage is applied in opposite phase. Ordinarily the modulating voltage is applied through a center-tapped transformer to the control grids of the two tubes in a conventional push-pull connection while the carrier voltage is applied in parallel to the two tubes often by way of a common cathode connection.

Although various other circuits of this general type have been devised all of these require the application of the modulating voltage to the two tubes by way of a push-pull or balanced connection. Thus if, as is often the case, it becomes necessary to employ equalization or filtering of the modulating wave applied to the modulator, matched sets of input filter circuit components must be supplied for the two tubes. Further, it is always necessary to employ either a transformer or phase inverting circuit comprising one or more additional vacuum tubes to convert a single-sided or unbalanced modulating voltage into the required balanced modulating voltage for push-pull application to the modulating circuit. All of these requirements necessitate the provision of many additional circuit components thereby increasing the complexity of the apparatus and result in a significant increase in the cost of such apparatus.

It is the object of the present invention to provide a balanced modulator circuit adapted to receive a single-sided modulating voltage as well as a single-sided carrier voltage and to produce the advantageous results obtainable with the usual balanced modulator circuit without the use of complex phase inverting input arrangements for the modulating wave.

To this end and in accordance with the invention, a balanced modulator for single-sided input signals has been provided which includes a pair of electron tubes, each having at least cathode, anode and control grid elements, these tubes being connected in a circuit arrangement similar in many respects to the well-known cathode phase inverter or cathode coupled paraphase amplifier. The modulating wave is applied between the control grid of one of the tubes and a reference point while the control grid of the other of the tubes is effectively connected to the reference point. The two tubes are provided with a common cathode resistor and a single-sided carrier voltage is applied to the two tubes in parallel. A conventional push-pull output circuit is employed in which a carrier-suppressed double sideband modulated wave is produced.

The above and other details of the invention will be described in the following detailed specification with reference to the drawing in which the single figure is a schematic circuit diagram of a balanced modulator according to the invention.

As shown in the single figure of the drawings, the improved balanced modulator of the invention comprises a pair of vacuum tubes 10 and 12 which are here shown as triode-type tubes having only cathode, control grid and anode elements but which may, if desired, include additional electrode elements. It will be further understood that although the two electron tubes 10 and 12 are shown as comprising separate structures it may be advantageous in many instances to obtain a further economy in apparatus by the use of a so-called twin triode having a pair of triode sections in a single envelope. The two vacuum tubes are connected in a circuit configuration similar in many respects to that employed in the so-called cathode phase inverter circuit as shown for example at page 137 of Theory and Application of Electron Tubes, by Reich, McGraw-Hill, 1939. The present circuit, however, varies markedly from the cathode phase inverter in several important respects. The most significant of these involves the fact that when a pair of electron tubes are operated as a cathode phase inverter the circuit parameters and applied voltages are adjusted to permit linear operation of the two electron tubes while in the present application it is essential that the two tubes be operated as non-linear devices thereby to provide the requisite modulating action.

In the balanced modulator of the present invention an unbalanced or single-sided modulating wave is applied through a capacitor 14 to the control grid of one of the two electron tubes, for example, electron tube 10. The control grid of this tube is provided with a grid return resistor 16 connected to a reference point common to the unbalanced input circuit (shown herein as ground). The cathodes of the two electron tubes are connected together and through an unbypassed cathode resistor 18 to the same point. Resistor 18 is of relatively large value and provides a large amount of degeneration. Such degenerative action, among other things, inherently renders the cathodes of the two tubes highly positive with respect to the corresponding control grids in the steady state condition. The effective large negative bias thus applied to the grids causes them to operate over non-linear portions of their transfer characteristics. The control grid of the other electron tube 12 is effectively connected to the reference point refered to above, a resistor 20 and possibly other elements such as a parallel connected capacitor being provided as required to obtain the proper operating potentials for non-linear operation of electron tube 12. The carrier wave here shown as a single-sided or unbalanced wave is applied through a series resistor 22 to the junction of the cathodes of tubes 10 and 12. The anodes of tubes 10 and 12 are connected to output terminals 24 and 26 through a transformer 28 to provide the well-known push-pull type of output circuit. The primary winding of transformer 28 which is connected between the anodes of tubes 10 and 12 may be center tapped and a source of anode potential connected to the tap for the purpose of supplying the two tubes or as shown in the drawing a potentiometer 30 may be connected across the primary winding of transformer 28 and the source of anode potential applied to the movable tap thereof to provide convenient means for balancing the two tubes of the modulator.

Also shown in the drawing in dashed line form are an output filter 32 which may be of the band-pass type and is provided if desired to obtain a single side band output in the usual manner and an input filter circuit 34 which may be provided if desired for the purpose of equalization or for elimination of certain frequency components from the modulating wave. It will be observed that filter unit 34 need not be duplicated as would be the case in a balanced input circuit. This affords a marked reduction in the complexity of a balanced modulator circuit which is of particular importance if the balanced modulator is to be employed in a servo system where it may be desired to obtain a narrow band output signal and to eliminate all extraneous components from the modulating wave.

One explanation of the operation of the circuit of the invention may be made in terms of operation of the cathode phase inverter circuit. Thus the single-sided or unbalanced modulating voltage applied to the control grid of vacuum tube 10 is effectively amplified by that tube. Since the cathode resistor 18 provides a large amount of linear degeneration, vacuum tube 10 operates in one respect as a cathode follower, that is, as the potential of the control grid with respect to a reference point is increased so also is the potential of the cathode by virtue of the increased flow of electron current and the consequent increased potential drop across unbypassed resistor 18. This has the effect also of increasing the potential of the cathode of vacuum tube 12. Since the control grid of this tube is effectively returned to the reference point (in this case to ground) the increase in the potential of its cathode is the full equivalent of a decrease in the potential of its control grid. When the various circuit parameters are properly chosen the change in potential of the control grid of tube 12 with respect to the fixed reference is equal and opposite to the change in potential of the control grid of vacuum tube 10. As a result of these factors the single-sided modulating voltage applied to the control grid of vacuum tube 10 appears effectively as a push-pull input signal on the control grids of the two modulator tubes 10 and 12. The carrier wave applied through resistor 22 to the common cathode connection of the two tubes is effectively applied to the two in parallel as in the usual balanced modulator circuit and by virtue of the fact that the two tubes are operated as non-linear devices, modulation product side bands as well as the carrier component appear in the anode circuits of the two tubes. Since the carrier voltage is applied to the two tubes in parallel it may be suppressed by appropriate balancing of the two output circuits as for example by adjustment of the position of the tap on potentiometer 30 leaving only the upper and lower side band components in the secondary of the transformer 28. As in the case of the conventional balanced modulator all undesired side band components may be eliminated as for example by a band-pass filter 32.

From the above it will be seen that the circuit of the invention provides a convenient means for obtaining the type of output signal ordinarily provided by a conventional balanced modulator circuit and that this result is obtained without the necessity of employing input transformers or phase inverting circuits to convert a single-sided modulating voltage into the push-pull input wave ordinarily required for such circuits.

What is claimed is:

1. A balanced modulator for single-sided input signals comprising a pair of electron tubes operated as non-linear devices and each having at least cathode, anode and control grid elements, a cathode resistor common to both of said tubes, means for applying a modulating wave to one of said grid elements, means for effectively grounding the other of said grid elements, means for applying a carrier wave to said tubes in like phase and an output circuit for said tubes connected between the anodes thereof and comprising a transformer the primary winding of which is connected to said anodes and which is tapped at a balance point for the application of operating potential to said tubes.

2. A balanced modulator for single-sided input signals comprising a pair of electron tubes operated as non-linear devices and each having at least cathode, anode and control grid elements, a push-pull output circuit connected between said anodes, a resistor common to the anode-cathode circuits of both said tubes, means for effectively connecting one of said control grids to the terminal of said resistor remote from said cathodes, means for applying a modulating wave between the other of said control grids and said terminal of said resistor, and means for applying a carrier wave in like phase to both of said control grids.

3. A balanced modulator for single-sided input signals comprising a pair of electron tubes each having at least cathode, anode and control grid elements, means for operating said tubes as non-linear devices, a push-pull output circuit connected between said anodes, a load resistor connecting said cathodes to ground, means for effectively grounding one of said grids, means for applying a modulating wave to the other of said grids and means for applying a single-sided carrier wave across said resistor.

4. A balanced modulator for single-sided input signals comprising a pair of electron tubes each having at least cathode, anode and control grid elements, means for operating said tubes as non-linear devices, a push-pull output circuit connected between said anodes, a resistor connected between a point common to said cathodes and a reference point, means for effectively connecting one of said control grids to said reference point, means for applying a modulating wave between the other of said control grids and said reference point, and means for applying a carrier wave between said common point and said reference point.

References Cited in the file of this patent

UNITED STATES PATENTS

| Number | Name | Date |
|---|---|---|
| 2,602,919 | Drazy | July 8, 1952 |

FOREIGN PATENTS

| Number | Country | Date |
|---|---|---|
| 338,140 | Italy | Mar. 28, 1936 |